United States Patent [19]

Young, II et al.

[11] 4,177,758
[45] Dec. 11, 1979

[54] REARING APPARATUS FOR FISH FRY

[76] Inventors: Dale E. Young, II, Rte. 4, Box 4915-Z, Juneau, Ak. 99803; David K. Elie, 13551 35th Ave. NE., Seattle, Wash. 98125; Peter K. Schoening, 5807 NE. 151st Ave., Bothell, Wash. 98011

[21] Appl. No.: 873,203

[22] Filed: Jan. 30, 1978

[51] Int. Cl.² ............................................. A01K 61/00
[52] U.S. Cl. ..................................................... 119/3
[58] Field of Search ................................ 119/3, 5, 2, 4

[56] References Cited
U.S. PATENT DOCUMENTS

| 180,085 | 7/1876 | Wilmot | 119/3 |
| 2,982,246 | 5/1961 | Kidder | 119/3 |

Primary Examiner—Hugh R. Chamblee
Attorney, Agent, or Firm—Ford E. Smith; David L. Garrison

[57] ABSTRACT

A rectangular rearing tank is provided with an underflow outlet conduit extending to beneath a tank corner where it couples to a smooth-curved transitional conduit section forming a bottom part of a weir chamber through which both underflow and overflow effluent from the tank may be passed in a stress-relieving manner that avoids injury or death to fry and fingerlings.

7 Claims, 6 Drawing Figures

REARING APPARATUS FOR FISH FRY

STATEMENT OF THE INVENTION

This invention is concerned with providing apparatus for rearing fish fry which permits the assembly of a battery of rearing tanks, each with its own weir chamber and weir gate means and the associated conduits whereby a minimum of floor space is occupied and easy passage for necessary maintenance operations is provided; whereby handling the water-borne fry of the fingerlings is the least harmful but nevertheless rapid and efficient; and whereby uncomplicated manufacturing techniques are employed so that costs are kept low and production is efficient.

There is shown in the accompanying drawings and described hereafter in detail, a preferred embodiment of this fish fry rearing and handling apparatus. Alternatives and variations will readily occur to those skilled in the art.

DESCRIPTION OF A PREFERRED EMBODIMENT

Figure 1:
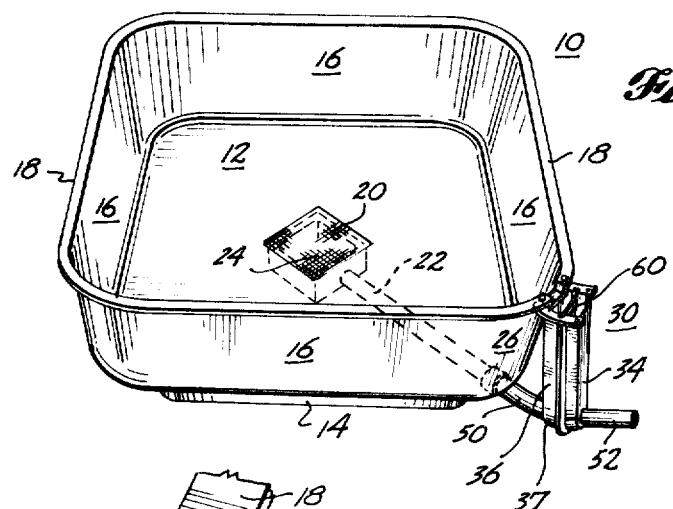
FIG. 1 is a perspective view of a rearing tank and weir chamber assembled therewith.
Figure 6:
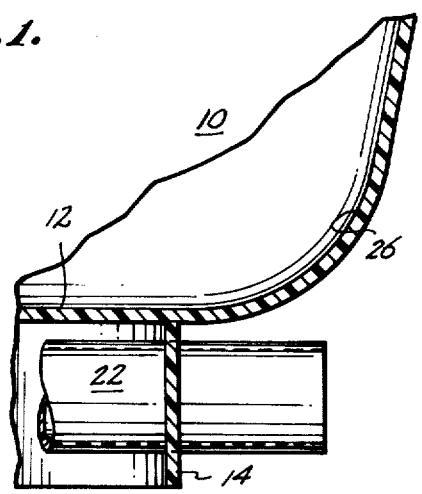
FIG. 6 is a fragmentary elevational view in section at a tank corner.

For the first few weeks after incubation and hatching, fish fry are kept in rearing tanks of which tank 10 shown in FIG. 1 is typical. Such tanks are generally molded of resin and fiberglass materials with rounded corners where walls join the bottom and where the walls join each other. Tank 10 comprises a bottom 12 beneath which is a supporting base collar 14. Above bottom 12, walls 16 rise and flare to the reinforcing lip 18. A basin 20 is usually provided at the center of the bottom and an underflow discharge conduit 22 extends therefrom. Basin 20 is normally covered by a screen 24. In this invention, the conduit 22 courses from one side wall of basin 20 beneath bottom 12 in space within base collar 14 toward corner 26 of tank 10. Due to the inward convergence downward of walls 16 to join bottom 12 there is free space under lip 18 which may be used very practically, as will more fully appear as this description progresses.

Normally, a tank 10 has a water depth of about 4 to 36 or more inches in which is placed thousands of salmon or trout fry. During the rearing stage, screen 24 covers basin 20 to restrain outward passage of the developing fry through conduit 22. Water is constantly supplied to and withdrawn from the rearing tank. When the fry have reached the fingerling stage, screen 24 is displaced and the fingerlings swim with the outgoing water through conduit 22.

Figure 2:
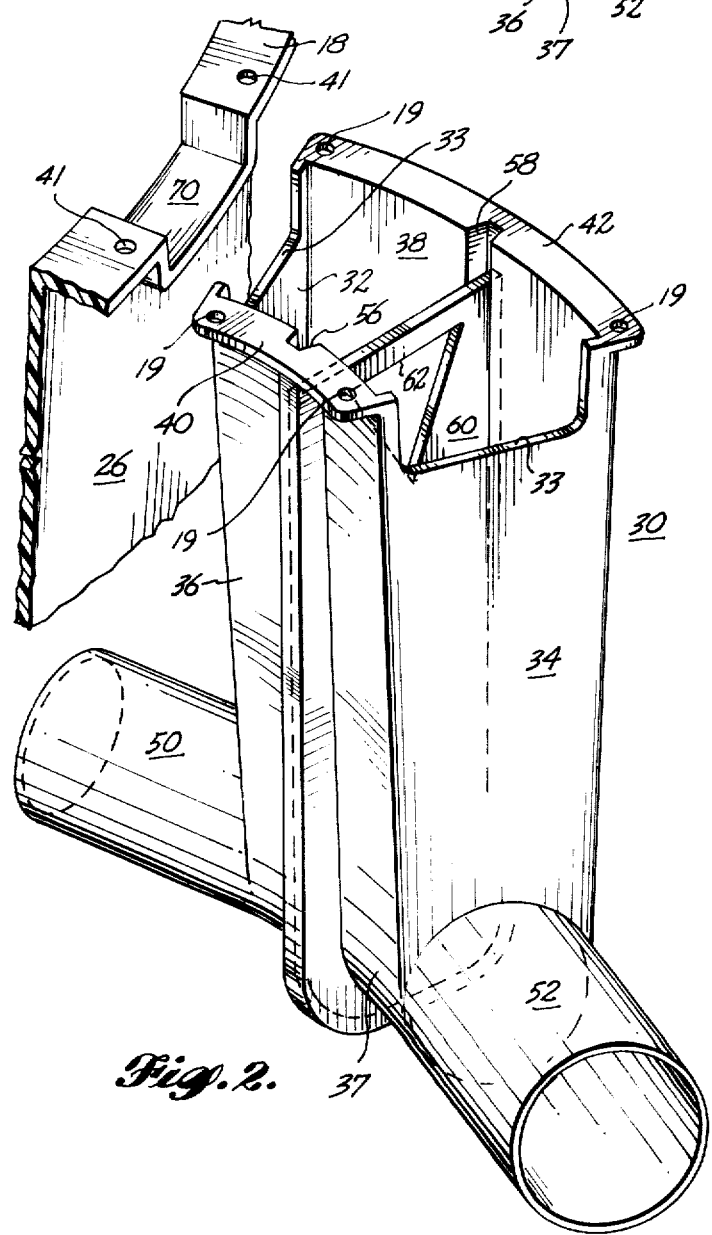
FIG. 2 is an enlarged perspective view of a preferred embodiment of a weir chamber.
Figure 4:
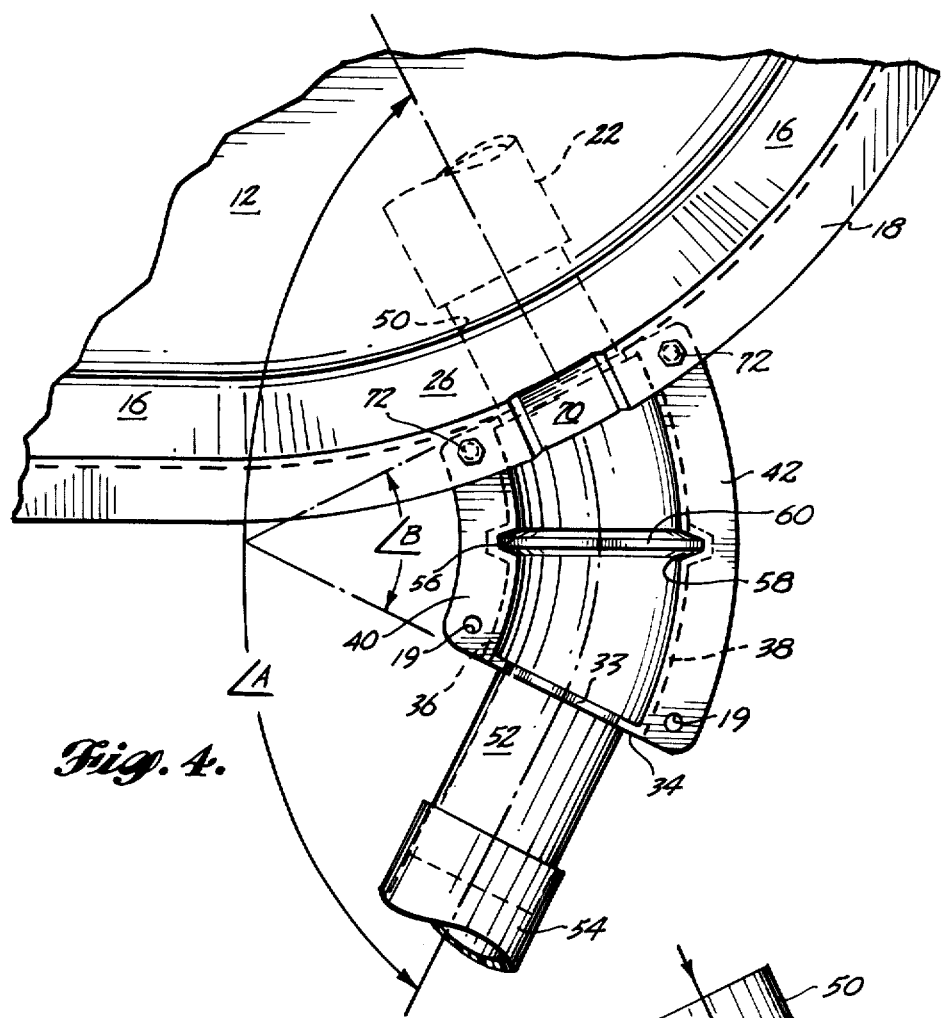
FIG. 4 is a plan view showing the weir chamber attached to a corner of a rearing tank.
Figure 5:
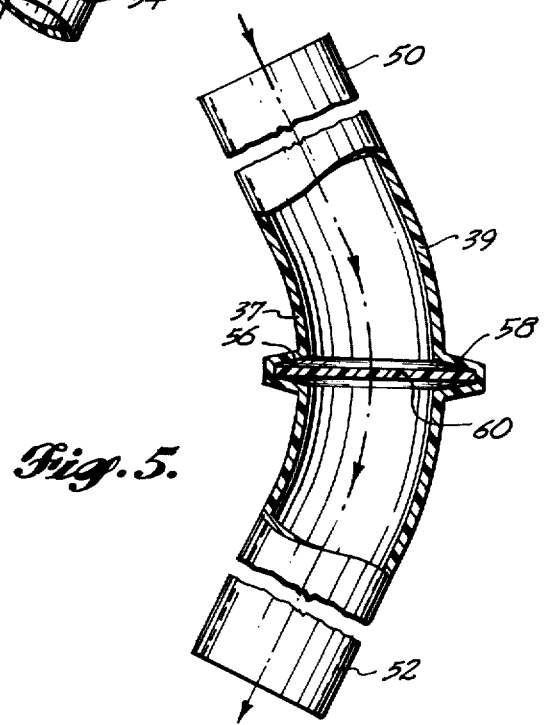
FIG. 5 is a horizontal section of a transitional conduit associated with a weir tank.

Turning to FIGS. 2, 4 and 5, the weir tank 30 will be seen to comprise first and second side walls 32 and 34, short curved wall 36 and long curved wall 38. Preferably, walls 36 and 38 are concentric and have flanges 40 and 42 on their upper edges. Notches 44 and 46 are formed at the upper edges of walls 32 and 34, respectively. Walls 32 and 34 are angularly disposed relative each as indicated by angle B in FIG. 4. Thus, it will be seen that perpendiculars to walls 32, 34 are angularly disposed relative each other at an angle A which is the reciprocal of angle B. Thus, if angle B is acute, angle A will be obtuse, the two angles totalling 180°. Angle A may be in the range of 125° to 140°, in which case angle B ranges from 55° to 40°. The preferred relationship is an angle A of 135° and angle B of 45°.

Nipples 50 and 52 extend normally from the lower extremities of walls 32 and 34 respectively and, in the preferred form, their axes are 135° apart. The lower portions 37, 39 of walls 36, 38 curve under and, with nipples, form a smoothly curved transitional passage 54 at the bottom of weir chamber 30 as can best be seen in FIG. 5.

In the situation described, water-borne fingerlings being discharged from tank 12 pass through basin 20 into conduit 22 to nipple 50 connected thereto beneath tank corner 26, thence through the bottom of weir chamber 30 into nipple 52 and onward via conduit 54. It will be seen that these means combine to form and provide a stress-relieving passage through the weir chamber that is smoothly curved and marked by the absence of abrupt shoulders or elements that could tend to produce strong current and eddy conditions in the flowing water, such being deleterious to the highly concentrated and fragile fingerlings or immature fish.

Figure 3:
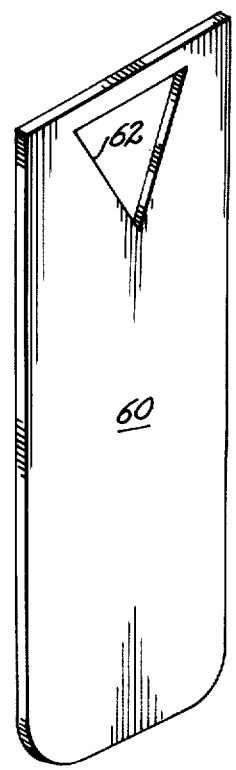
FIG. 3 is a perspective view of a weir.

Walls 36 and 38 include infacing opposed grooves 56 and 58, sized and designed to receive weir gate 60 shown in FIG. 3. Gate 60 is inserted and withdrawn from the opposed grooves from above. The opening 62 serves as a water level control means and provides a hand opening. Gate 60 is normally raised and secured sufficiently high that the water depth in tank 12 is controlled as desired by the operator of the hatchery or of this and other rearing tanks. Usually a water depth of about 4 to 36 or more inches is preferred.

Whenever the tank is to be emptied, gate 60 is removed and screen 24 is displaced and all the water and fingerlings in it pass out as described.

In the event screen 24 becomes clogged to such extent that the water depth rises undesirably, when the water level reaches the vicinity of tank lip 18 it flows through notch 70 above corner 26 and into the chamber between wall 32 and gate 60 until that is full, in which case it overflows through opening 62 and downward to nipple 52, thence away.

The upper portion of weir chamber 30 is stabilized relative tank 10 by means of fasteners 72, 72 securing lip 18 and flanges 40 and 42 together as best seen in FIG. 2. The fasteners pass through holes 19 and 41 when they are brought together. Walls 32 and 34 are each provided with a notch 33 which permits the weir wall 32 or 34 to be placed under notch 70 as desired. It will be seen then that weir chamber is reversible and that it can be directed as in FIG. 1 or opposite as in FIG. 2. Conduits extending from the weir chamber generally lie on the ground or floor inside the tank lips leaving free and uncluttered passage for the attendants In compliance with the statute, the invention has been described in more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. Rearing apparatus for fish frys comprising:
   a rectangular tank having a discharge outlet basin in the bottom;
   foraminous means screening said basis;
   a first conduit extending from said outlet basin to beneath a tank corner;
   a second conduit having its axis disposed at an obtuse angle to the axis of said first conduit;
   a smoothly curved transitional conduit connecting between said first and second conduits whereby to form a continuous stress-relieving passage for fish fry;
   wall means connected with and rising above said transitional conduit and being in flow communication with said stress-relieving passage and forming an upright weir chamber; and
   means forming a vertically movable weir in said chamber normally blocking said passage to such a degree as to govern the water depth in said tank.

2. The structure according to claim 1 in which there are guide grooves in said transitional conduit and said weir chamber for normally retaining said weir gate in place.

3. The structure according to claim 1 in which the axis of the second conduit is disposed at an angle to the axis of said first conduit in the range 125° to 140°.

4. The structure according to claim 3 in which said obtuse angle is 135°.

5. The structure according to claim 1 in which there is an overflow lip at the corner of the tank above said transitional passage constituting a notch and said weir chamber has a matching overflow notch whereby to receive effluent.

6. The structure according to claim 1 in which the upper edge of the tank overhangs the connection between said transitional conduit and said first conduit.

7. The structure according to claim 5 in which fastening means is included to secure the upper end of said weir chamber to said tank.

* * * * *